United States Patent [19]

Okada et al.

[11] Patent Number: 4,917,470

[45] Date of Patent: Apr. 17, 1990

[54] DRIVING METHOD FOR LIQUID CRYSTAL CELL AND LIQUID CRYSTAL APPARATUS

[75] Inventors: Shinjiro Okada, Kawasaki; Junichiro Kanbe, Yokohama, both of Japan

[73] Assignee: Canon Kabushiki Kaisha, Tokyo, Japan

[21] Appl. No.: 273,745

[22] Filed: Nov. 16, 1988

Related U.S. Application Data

[63] Continuation of Ser. No. 818,702, Jan. 14, 1986, abandoned.

[30] Foreign Application Priority Data

Jan. 14, 1985 [JP] Japan ................................ 60-003231

[51] Int. Cl.[4] ................................ G02F 1/133

[52] U.S. Cl. ................................ 350/333; 350/350 S; 350/339 R; 350/341; 340/805

[58] Field of Search .................... 350/331 R, 332, 333, 350/346, 350 S, 339 R, 341; 340/765, 784, 805, 811

[56] References Cited

U.S. PATENT DOCUMENTS

| | | | |
|---|---|---|---|
| 3,957,349 | 5/1976 | Nelson | 350/332 |
| 4,024,529 | 5/1977 | Sakai | 340/805 |
| 4,508,429 | 4/1985 | Nagae et al. | 350/333 |
| 4,529,271 | 7/1985 | Berreman et al. | 350/333 |
| 4,649,517 | 3/1987 | Kitazima et al. | 350/333 |
| 4,681,404 | 7/1987 | Okada et al. | 350/350 S |
| 4,738,515 | 4/1988 | Okada et al. | 350/350 S |

FOREIGN PATENT DOCUMENTS

| | | | |
|---|---|---|---|
| 0177365 | 4/1986 | European Pat. Off. | 350/333 |
| 2141279 | 12/1984 | United Kingdom | 350/333 |

*Primary Examiner*—John S. Heyman
*Assistant Examiner*—Tai V. Duong
*Attorney, Agent, or Firm*—Fitzpatrick, Cella, Harper & Scinto

[57] ABSTRACT

A driving method for a liquid crystal cell of the type comprising a pair of oppositely spaced electrodes and a memory type liquid crystal disposed between the oppositely spaced electrodes, the driving method comprising: applying a driving voltage waveform provided with an attenuation slope at the falling part thereof.

11 Claims, 5 Drawing Sheets

DRIVING METHOD FOR LIQUID CRYSTAL CELL AND LIQUID CRYSTAL APPARATUS

This application is a continuation of application Ser. No. 818,702 filed Jan. 14, 1986.

FIELD OF THE INVENTION AND RELATED ART

The present invention relates to a driving method for a memory-type liquid crystal cell, particularly a driving method for a ferroelectric liquid crystal cell.

Conventionally used signals for driving a non-memory type liquid crystal, e.g., a TN (twisted nematic) liquid crystal, have been rectangular pulses which are continually applied to picture elements and which are generally applied to a liquid crystal cell in the form of AC signals. This is because the liquid crystal is of non-memory type or lacks a memory characteristic so that it is necessary to apply a voltage in order to keep a display state of the liquid crystal, and because the liquid crystal is deteriorated by application of a DC voltage.

On the other hand, a memory-type liquid crystal or a liquid crystal having a memory characteristic, such as a ferroelectric liquid crystal does not necessitate continual application of rectangular pulses as required for driving a TN liquid crystal as described above. However, an alternating signal having a voltage level below the threshold level should be continually applied to a picture element which has been written and is not being addressed, because if a voltage having a polarity different from that of a voltage signal used for writing is applied to a non-addressed picture element, the written state is liable to be inverted even if the voltage applied to the non-addressed picture element is below the threshold level. For this reason, rectangular pulses are always applied to electrodes constituting a picture element.

However, the application of rectangular pulses to a memory type liquid crystal cell, particularly a ferroelectric liquid crystal cell, is accompanied with a problem which is not serious in a conventional TN liquid crystal cell. Thus, the response of the conventional TN liquid crystal is not so fast, and therefore discharge of a charge from a dielectric layer (e.g., an orientation control film such as that of a polyimide formed on electrodes provided on an inside face of a cell) generated at the time of fall-down of a rectangular pulse is negligible. For a liquid crystal having a high response speed such as a ferroelectric liquid crystal, however, the discharge from the dielectric layer is not negligible. Particularly, in the case of a ferroelectric liquid crystal, as the direction of an electric field applied thereto determines the state of the liquid crystal, a written state can be inverted, if a reverse polarity of electric field is generated due to the above mentioned discharge phenomenon at the time of fall-down of a rectangular driving voltage pulse.

SUMMARY OF THE INVENTION

A principal object of the present invention is, in order to solve the above mentioned problem, to provide a driving method for a liquid crystal cell, whereby a voltage effect accompanying the fall-down of a pulse driving waveform is smoothed or minimized to prevent the inversion of a liquid crystal state, even when a ferroelectric liquid crystal is used.

According to the present invention, there is provided a driving method for a liquid crystal cell of the type comprising a pair of oppositely spaced electrodes and a memory type liquid crystal disposed between the oppositely spaced electrodes, the driving method comprising: applying a driving voltage waveform provided with an attenuation slope at the falling part thereof.

The attenuation slope is a moderately descending slope of a desired shape inclusive of one expressed by a linear or exponential function. The method is particularly suited for driving a liquid crystal cell using a ferroelectric liquid crystal as a memory type liquid crystal.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

As a memory type liquid crystal used in the driving method according to the present invention, a liquid crystal, particularly a ferroelectric liquid crystal, showing at least two stable states, particularly a ferroelectric liquid crystal showing bistability, i.e., showing either a first optically stable or a second optically stable state depending on an electric field applied thereto, may be used.

Most preferable liquid crystals having bistability which can be used in the driving method according to the present invention are chiral smectic liquid crystals having ferroelectricity. Particularly, liquid crystals showing chiral smectic C phase (SmC*) or H phase (SmH*) may suitably be used. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcilidene-4'-octylaniline (MBRA 8), etc.

When a device is constituted by using these materials, the device may be supported with a block of copper, etc., in which a heater is embedded in order to realize a temperature condition where the liquid crystal compounds assume an SmC* or SmH* phase.

In the present invention, ferroelectric liquid crystals showing a chiral smectic I phase (SmI*), J phase (SmJ*), G phase (SmG*), F phase (SmF*) or K phase (SmK*) may also be used in addition to the above mentioned SmC* or SmH* phase.

Figure 3:
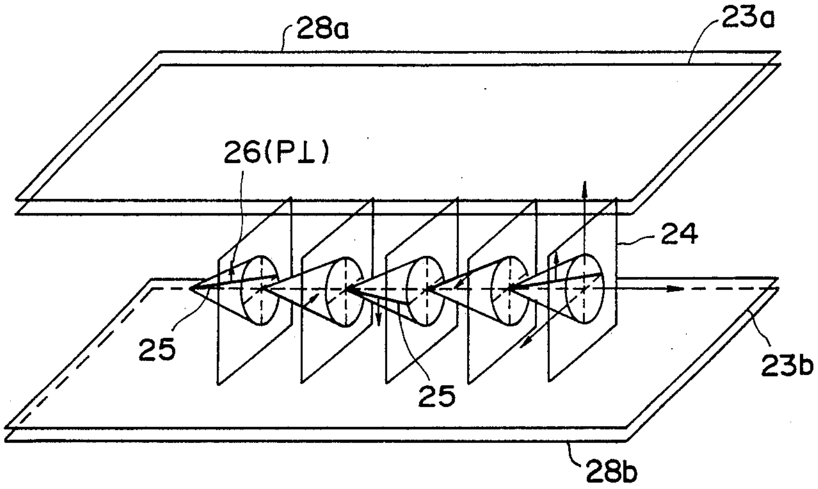
FIGS. 3 and 4 are schematic perspective views for illustrating the operation principle of a ferroelectric liquid crystal device used in the present invention.
Figure 4:
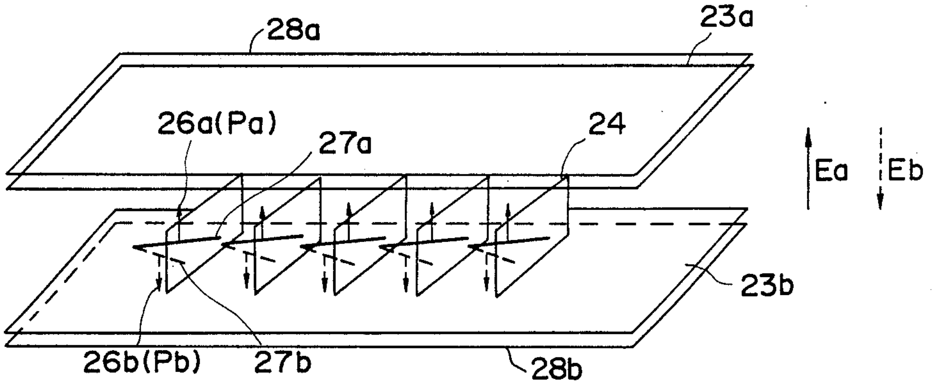

Referring to FIG. 3, there is schematically shown an example of a ferroelectric liquid crystal cell for explanation of the operation thereof. Reference numerals 23*a* and 23*b* denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 24 are oriented perpendicular to surfaces of the glass plates is hermetically disposed therebetween. A full line 25 shows liquid crystal molecules. Each liquid crystal molecule 25 has a dipole moment ($P_\perp$) 26 in a direction perpendicular to the axis thereof. When a voltage higher than a certain threshold level is applied between electrodes formed on the base plates 23*a* and 23*b*, a helical structure of the liquid crystal molecule 25 is loosened or unwound to change the alignment direction of respective liquid crystal molecules 25 so that the dipole moment ($P_\perp$) 26 are all directed in the direction of the electric field. The liquid crystal molecules 25 have an elongated shape and show refractive anisotropy between the long axis and the short axis thereof. Accordingly, it is easily understood that when, for instance, polarizers 28*a* and 28*b* arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is loosened even in the absence of an electric field whereby the dipole moment assumes either of the two states, i.e., Pa in an upper direction 26*a* or Pb in a lower direction 26*b* as shown in FIG. 4. When electric field Ea or Eb higher than a certain threshold level and different from each other in polarity as shown in FIG. 4 is applied to a cell having the above-mentioned characteristics, the dipole moment is directed either in the upper direction 26*a* or in the lower direction 26*b* depending on the vector of the electric field Ea or Eb. In correspondence with this, the liquid crystal molecules are oriented in either of a first stable state 27*a* and a second stable state 27*b*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 4. When the electric field Ea is applied to the liquid crystal molecules, they are oriented in the first stable state 27*a*. This state is kept stable even if the electric field is removed. On the other hand, when the electric field Eb the direction of which is opposite to that of the electric field Ea is applied thereto, the liquid crystal molecules are oriented to the second stable state 27*b*, whereby the directions of molecules are changed. This state is also kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in U.S. Pat. No. 4,367,924 by Clark and Lagerwall.

In a case where a ferroelectric liquid crystal having a memory characteristic and a high response speed is used, a voltage above the threshold level is required to be applied to a picture element only when the picture element is selected. As described above, the ferroelectric liquid crystal assumes a first stable state when a voltage above the threshold level is applied in one direction perpendicular to the cell face and assumes a second stable to be rewritten when a voltage above the threshold level is applied in the opposite direction. A liquid crystal cell to be used for this purpose is required to be provided with opposite electrodes on a pair of base plates inside the cell and with a dielectric layer coating the electrodes. When a rectangular pulse signal is applied to form an electric field in a direction of, e.g., from an upper base plate to a lower one, at the time of falling-down of the rectangular pulse, a charge stored in the dielectric layer is discharged to form an electric field in a reverse direction, i.e., from the lower base plate to the upper one.

The dielectric layer is disposed in the thickness of generally 5000 Å or less, preferably 100 to 5000 Å, and more preferably 500 to 3000 Å, and may be disposed on either one side or both sides of the pair of electrodes.

Figure 6A:
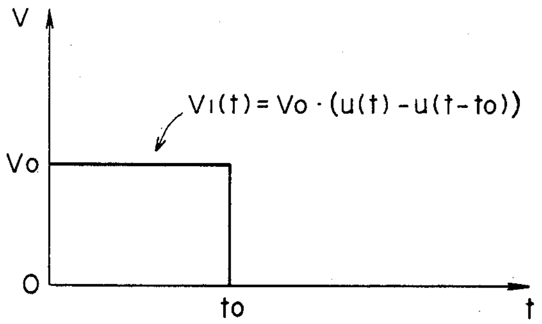
FIG. 6a PRIOR ART
FIGS. 6(*a*) and 6(*b*) shows a conventionally used rectangular pulse voltage waveform.
Figure 6B:
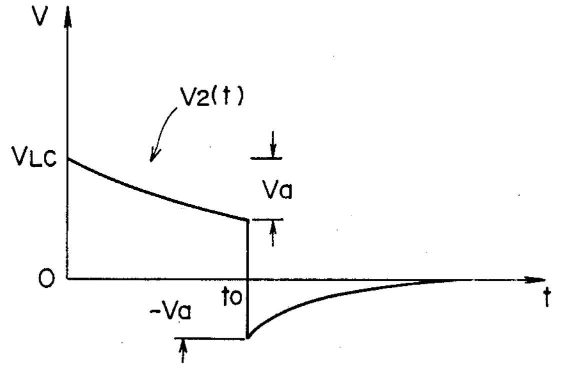
FIG. 6b PRIOR ART

Now, when a rectangular pulse as shown in FIG. 6(*a*) having a pulse height of $V_0$ and a pulse duration of $t_0$ is applied, then the voltage $V_2(t)$ effectively applied to the liquid crystal layer at the real time is as shown in FIG. 6(*b*) and expressed by the following equation by using a unit step function u(t) (as in the equations appearing hereinafter and noted in the figures):

$$V_2(t) = \frac{C_1}{C_1 + C_2} \cdot V_0 \cdot \exp\left(-\frac{t}{R_2(C_1 + C_2)}\right) \times \left\{1 - \exp\left(\frac{t_0}{R_2(C_1 + C_2)}\right) \cdot u(t - t_0)\right\}$$

(for $t > t_0$, and $u(0) = 1$)

wherein $C_1$ is the capacitance of the dielectric layer, $C_2$ is the capacitance of the liquid crystal layer, and $R_2$ is the resistance of the liquid crystal layer. "$V_{LC}$" in FIG. 6(*b*) denotes a voltage applied to the liquid crystal layer at the time of rising of the pulse $V_0$.

According to the present invention, the inversion of the liquid crystal display state is prevented by providing a moderate slope to the falling-down waveform of the application voltage pulse.

Hereinbelow, the present invention will be explained with reference to an embodiment and drawings.

Figure 1A:
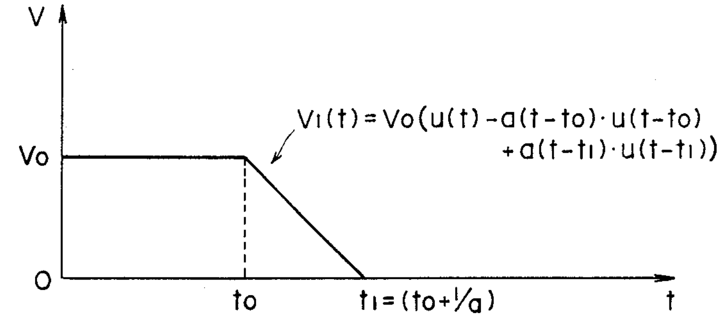
FIG. 1(*a*) shows an application or input voltage waveform used in the present invention, and FIG. 1(*b*) shows a voltage waveform applied to a liquid crystal layer due to the application voltage.
Figure 1B:
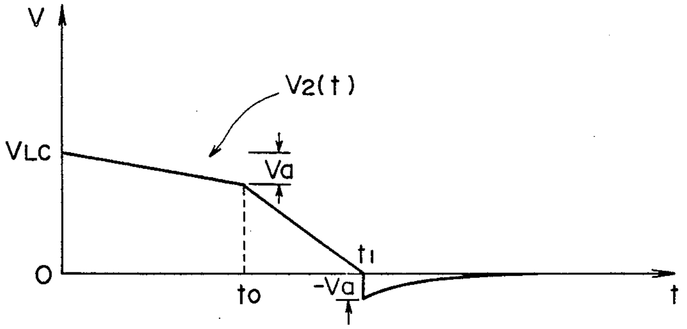

FIGS. 1(*a*) and 1(*b*) show a voltage effect according to an embodiment of the driving method of the present invention. FIG. 1(*a*) shows an application voltage waveform $V_1(t)$ with a linear attenuation in the falling-down curve wherein $V_0$ is a pulse height, $t_0$ is a pulse duration. The application voltage waveform $V_1(t)$ is expressed by the following formula, if the time giving $V_1(t)=0$ is denoted by $t_1$ and the slope of the falling-down line by a;

$$V_1(t)=V_0\{u(t)-a(t-t_0)\cdot u(t-t_0)+a(t-t_1)\cdot u(t-t_1)\}.$$

Herein, the attenuation line during the period of $t_0-t_1$ is expressed by the function of $$V=V_0\{1-a(t-t_0)\}.$$

By the application of the pulse with the waveform of $V_1(t)$, a voltage waveform $V_2(t)$ as shown in FIG. 1(*b*) and expressed by the following formula is applied to the liquid crystal layer:

$$V_2(t) = \frac{C_1}{C_1+C_2}\cdot V_0\cdot \exp\left(-\frac{1}{R_2(C_1+C_2)}\right) - \frac{C_1}{C_1+C_2}\cdot a\cdot V_0\left\{1-\exp\left(-\frac{t-t_0}{R_2(C_1+C_2)}\right)\right\}u(t-t_0) + \frac{C_1}{C_1+C_2}\cdot a\cdot V_0\left\{1-\exp\left(-\frac{t-t_1}{R_2(C_1+C_2)}\right)\right\}u(t-t_1)$$

Thus, the amount of the inversion voltage $-Va$ is remarkably decreased so that the inversion of the liquid crystal state is obviated.

Figure 5A:
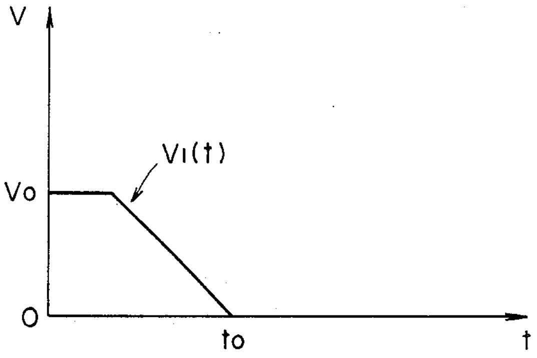
FIG. 5(*a*) shows another application voltage waveform used in the present invention and FIG. 5(*b*) shows a voltage waveform applied to a liquid crystal layer as a result.
Figure 5B:
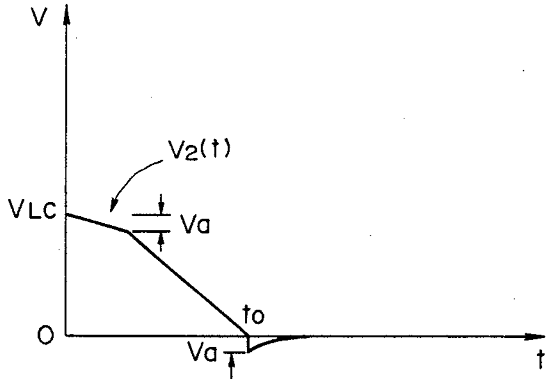

In another embodiment, the duration of application pulse may be made $t_0$, as shown in FIG. 5(*a*), which is equal to the pulse duration $t_0$ of the conventional application pulse shown in FIG. 6(*a*), while giving an attenuation slope as in the embodiment of FIG. 1. In this case, the voltage waveform applied to the liquid crystal layer is as shown in FIG. 5(*b*). According to this embodiment, the inversion voltage component $-Va$ applied to the liquid crystal layer can be further decreased.

More specifically, according to the present invention, the reverse polarity voltage pulse $-Va$ in FIG. 1(*b*) or FIG. 5(*b*) can be reduced to almost 0 volt as the time constant ($R_2C_2$) of the liquid crystal layer can be sufficiently smaller than $t_1-t_0$.

The attenuation or falling curve or function of the application voltage waveform need not be linear as in the above embodiments but may be logarithmic, negative exponential or stepwise, as far as the attenuation is unidirectional.

Figure 2:
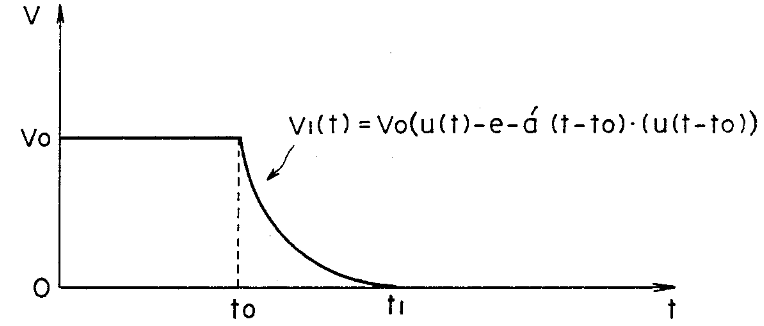
FIG. 2 shows another application voltage waveform used in the invention.

FIG. 2 shows another embodiment of the application voltage waveform to be used in the present invention, wherein an exponential attenuation slope is provided to the falling-down curve of the application voltage pulse. The application voltage waveform $V_1(t)$ as a whole is expressed by the following equation:

$$V_1(t)=V_0(u(t)-e^{-a'\cdot(t-t_0)}\cdot u(t-t_0)),$$

and the attenuation slope function is expressed by $V=V_0(1-e^{-a't})$, wherein a' denotes an exponential attenuation constant. The voltage applied to the liquid crystal layer is expressed by the following equation:

$$V_2(t) = \frac{t_0}{C_1+C_2}\{C_1\cdot e^{-\frac{t}{R2(C1+C2)}} + (J\cdot e^{-a'(t-t0)}\cdot K\cdot e^{\frac{t-t0}{R2(C1+C2)}})u(t-t_0)\},\text{ wherein } J=\frac{a'}{a'-A},\ K=\frac{A}{A-a'} \text{ and } A=\frac{1}{R_2(C_1+C_2)}.$$

Thus, it is clear that the inversion voltage has been decreased by the term of $J\cdot e^{-a'(t-t0)}$.

In any case, the slope of the attenuation curve should preferably be determined so that the time period $(t_1-t_0)$ will be 0.1 to 2 times, particularly 0.3 to 1 times, the time period $t_0$.

Figure 7:
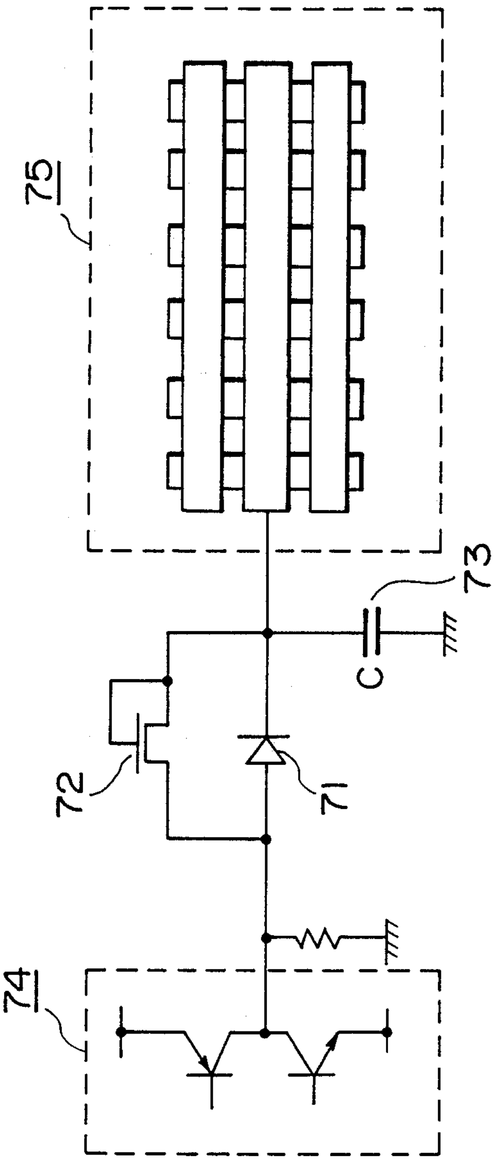
FIG. 7 is a circuit diagram showing a ramp generator for providing an attenuation slope.

A pulse accompanied with an attenuation slope may be generated and applied to a liquid crystal panel by incorporating a ramp generator in the driving circuit. For example, the waveform shown in FIG. 1(*a*) may be obtained by using a circuit including a diode 71 an FET (field effect transistor) 72 and a capacitor 73, which is inserted between a scanning side driver circuit 74, as shown in FIG. 7. Thus, the capacitor 73 is charged almost instantaneously through the diode 71 at the rise time and is charged by a constant current ($I_{FET}$) through the FET 72, whereby a ramp waveform as shown in FIG. 1(*a*) is formed. In this case, the falling time $(t_1-t_0)$ is given by $C\cdot V_0/I_{FET}$.

The present invention will be further explained with reference to specific examples.

EXAMPLE

A blank cell was prepared by combining a pair of base plates on which transparent electrodes were disposed and coated with a polyimide layer. A liquid crystal cell was prepared by injecting a ferroelectric liquid crystal DOBAMBC into the blank cell and kept at a temperature of 70° C.

When a rectangular pulse as shown in FIG. 6 with a pulse duration $t_0$ of 5 msec. and a pulse height of 18 V was applied to the liquid crystal layer at prescribed picture elements so as to switch the liquid crystal from the second state to the first state thereof to write in the picture elements, the inversion to the original second state occurred at almost all of the prescribed picture elements whereby the writing to the first state could not be effected.

In order to prevent the inversion, a linear slope of 1/5 (=a) was provided to the falling-down of the above pulse to obtain a voltage waveform as shown in FIG. 1(*a*), which was then applied to the liquid crystal layer at prescribed picture elements, whereby the first state was stably retained at the prescribed picture elements and the satisfactory writing was effected.

The application voltage waveforms for the above examples could be expressed as follows:

For FIG. 6(a)

$$V_1(t) = 18\cdot(u(t) - u(t-5\times10^{-3}))$$

For FIG. 1(a)

$$V_1(t) = 18\cdot(u(t) - 1/5\cdot(t-5\times10^{-3})\cdot u(t-5\times10^{-3}) + 1/5\cdot(t-5\times10^{-3})\cdot u(t-5\times10^{-3})$$

As described hereinabove, according to the present invention, there is provided a driving method for a liquid crystal cell which is characterized by applying a driving pulse waveform provided with a moderate slope at the falling-down part thereof and is capable of preventing the inversion of a voltage applied to the liquid crystal layer even when a ferroelectric liquid crystal is used.

We claim:

1. A driving method for a liquid crystal cell of the type constructed without a photoconductive layer comprising a pair of oppositely spaced electrodes forming a matrix electrode structure, a dielectric layer disposed on either one or both sides of the pair of electrodes, and a memory type ferroelectric liquid crystal disposed between the oppositely spaced electrodes, said driving method comprising the step of:

applying to the liquid crystal cell a driving voltage having a rectangular waveform of a duration provided with an attenuation slope at the falling part thereof.

2. The driving method according to claim 1, wherein said attenuation slope is expressed by a linear or exponential function.

3. The driving method according to claim 1, wherein said ferroelectric liquid crystal is a chiral smectic liquid crystal.

4. The driving method according to claim 1, wherein said ferroelectric liquid crystal is a chiral smectic liquid crystal having at least two stable states.

5. The driving method according to claim 1, wherein said ferroelectric liquid crystal is a bistable chiral smectic liquid crystal.

6. The driving method according to claim 1, wherein said ferroelectric liquid crystal is a chiral smectic liquid crystal with a non-spiral structure.

7. The driving method according to claim 1, which further comprises a dielectric layer of an insulating material between the pair of oppositely spaced electrodes.

8. A liquid crystal apparatus, comprising:

(a) a liquid crystal cell without a photoconductive layer comprising a pair of oppositely spaced electrodes forming a matrix electrode structure, a dielectric layer disposed on either one or both sides of the pair of electrodes, and a memory type ferroelectric liquid crystal disposed between the oppositely spaced electrodes;

(b) means for applying a driving voltage between the pair of electrodes, said means comprising means for applying a scanning voltage signal having a rectangular waveform of a duration provided with an attenuation slope at the falling part thereof; and (c) means for detecting an optical change based on a change in orientation of the memory type ferroelectric liquid crystal.

9. The liquid crystal apparatus according to claim 8, wherein said ferroelectric liquid crystal is a chiral smectic liquid crystal having at least two stable states.

10. The liquid crystal apparatus according to claim 8, wherein said attenuation slope is expressed by linear or exponential function.

11. The liquid crystal apparatus according to claim 8, wherein one of said pair of electrodes is connected to a scanning side driver circuit and is supplied with a pulse voltage waveform comprising a rectangular rising part followed by a constant amplitude and a attenuated falling slope.

* * * * *